Figure 1:
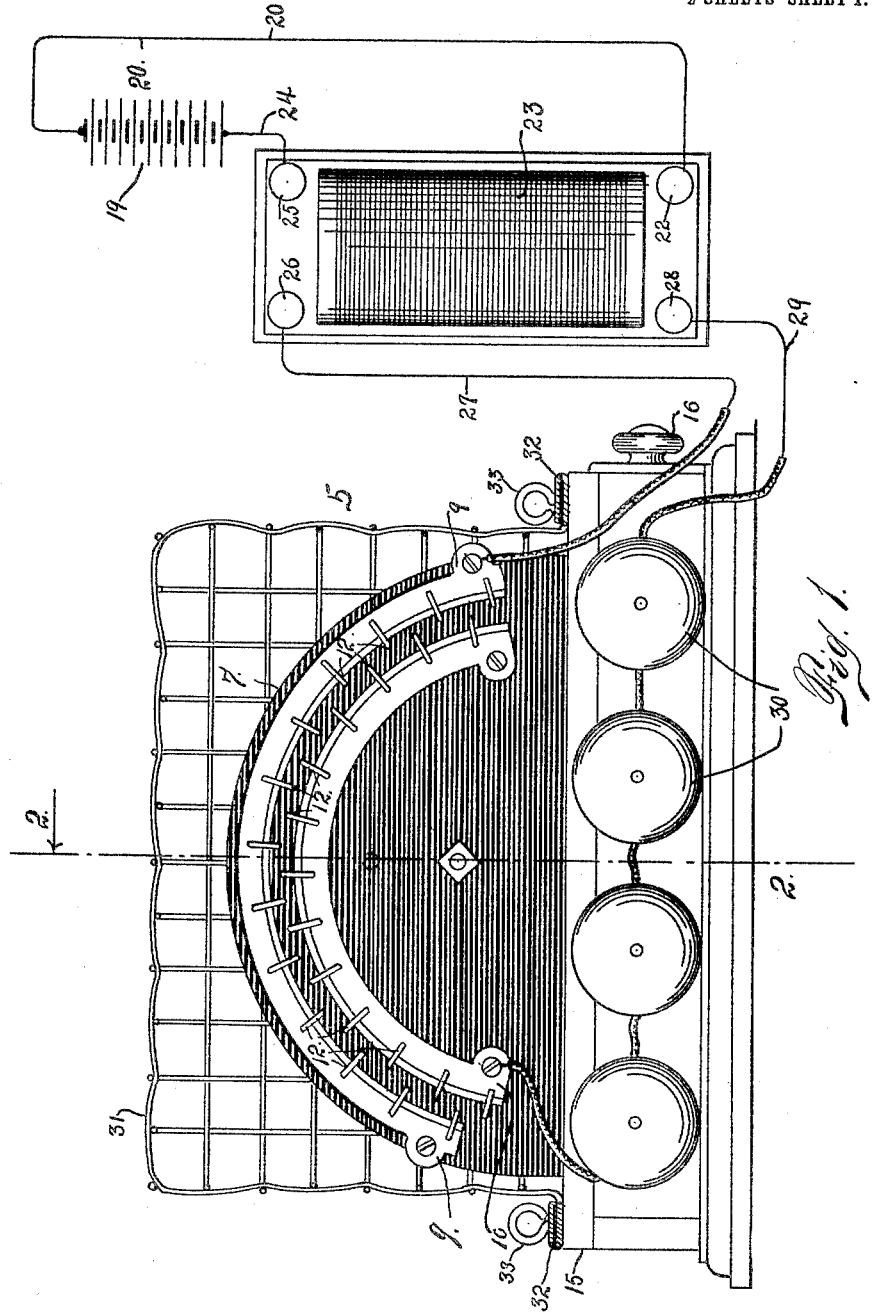

E. A. ALLEN & F. A. SPEENBURG.
INSECT EXTERMINATOR.
APPLICATION FILED AUG. 4, 1911.

1,108,309.

Patented Aug. 25, 1914.

2 SHEETS—SHEET 1.

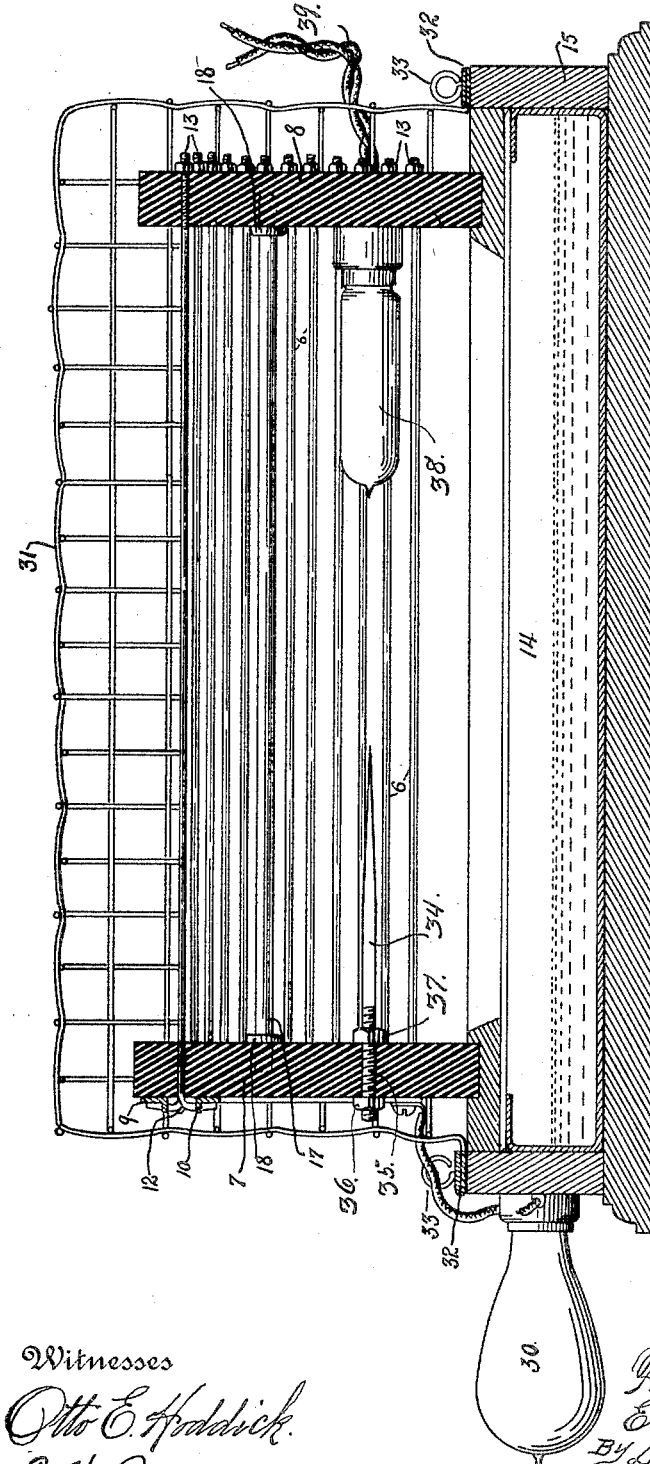

UNITED STATES PATENT OFFICE.

ERNEST A. ALLEN AND FRANK A. SPEENBURG, OF DENVER, COLORADO.

INSECT-EXTERMINATOR.

1,108,309.  Specification of Letters Patent.  Patented Aug. 25, 1914.

Application filed August 4, 1911. Serial No. 642,421.

*To all whom it may concern:*

Be it known that we, ERNEST A. ALLEN and FRANK A. SPEENBURG, citizens of the United States, residing in the city and county of Denver and State of Colorado, have invented certain new and useful Improvements in Insect-Exterminators; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in insect exterminators.

The object of our invention is to provide a device of this character which will attract insects in the vicinity of the same, and electrocute them.

Another object of our invention is the provision of a device for exterminating insects in a sanitary manner.

Another object of our invention is the provision of a device for exterminating insects in an inexpensive and efficient manner.

Another object of our invention resides in the construction of a device, so arranged that when a fly or other insect lights upon the same, the current of electricity will be short-circuited through the body of the insect, and instantly electrocute the same.

Another object of our invention is the provision of a device so constructed out of electrical conductors that they will be short-circuited by an insect.

Still another object of our invention resides in the construction of a device of this character, whereby when an insect is exterminated, it will immediately fall from the place of electrocution into a receptacle provided for that purpose.

To enable others skilled in the art to which our invention appertains, to make and use the same, we will proceed to describe its construction and mode of use, reference being made to the accompanying drawing, in which is illustrated an embodiment thereof.

In this drawing: Figure 1 is an end view of our insect exterminator. Fig. 2 is a longitudinal section of the same taken on the line 2—2, Fig. 1, looking in the direction of the arrow.

The same reference characters indicate the same parts in all the views.

Let the numeral 5 designate our insect exterminator proper in its entirety. This insect exterminator is composed of a plurality of parallelly arranged electrical conductors 6, secured at their extremities to insulating supports 7 and 8. To the front part of the insulating support 7 are mounted two sector-shaped contacts 9 and 10. As shown in the drawing, the conductors or wires 6 extend through the insulating support 7, and have their extremities bent at angles, as shown at 12 and overlapping the sector-shaped contacts 9 and 10; while the opposite extremities of the wires 6 passing through the insulating support 8, are threaded, and tension nuts 13 are applied thereto for tightening the said conductors.

The insulating supports 7 and 8 are mounted above a receptacle 14, which is open, and directly beneath the conductors, whereby when an insect is electrocuted, by short-circuiting the current through its body, it will fall into the receptacle. This receptacle 14 is arranged within a casing 15, and is in the form of a drawer, whereby the said receptacle may be removed from its casing for emptying the insects therefrom or for the purpose of filling the receptacle with any desired substance or water. This receptacle 14 is provided with a knob 16, by means of which the receptacle may be removed from the casing.

The two insulating supports 7 and 8 for the wires 6 are kept from approaching each other under tension of the wires 6, by means of a bar 17, having flanges 18 engaging the supports on the inner sides thereof.

We will now proceed to describe or follow out the circuits for charging the wires 6.

The reference character 19 indicates a source of energy, from one pole of which leads a wire 20 to a binding post 22 of an induction coil 23. From the opposite pole of the source of energy 19, a conductor 24 leads to a binding post 25 of the induction coil 23. The circuit we have thus traced constitutes the primary circuit. From a binding post 26 of the induction coil 23, a feed wire 27 leads to the contact 9. From a binding post 28 of the induction coil 23, a conductor 29 leads through lights 30 to the contact 10.

In the above, we have traced the circuits to the contacts 9 and 10; however, the induction circuit is normally broken, since the contacts 9 and 10 are secured to insulating material, and the wires 6 separated from each other. The wires 6 are spaced apart a sufficient distance to prevent the species of insects for which the device is designed to exterminate, from passing between the wires 6, without coming into contact with any two adjacent wires. Consequently, as soon as any two adjacent wires are bridged by an insect, the circuit is immediately closed through the body of the insect and instantly electrocutes the same. The lights 30 furnish a sort of resistance for the circuit and prevent the burning of the wires by being overcharged, and in addition thereto, will indicate that the circuit is closed, whenever from accident or other cause, the wires 6 are in contact with each other or bridged by material of a conductive nature. The body of an insect is not sufficiently conductive to carry enough electricity to result in damage to the wires or the circuit, nor to light the lights 30. However, if a piece of metal should bridge any two adjacent wires 6, or the wires be bent into contact with each other, the voltage passing through the same would result in burning the wires, were it not for the fact that the lights 30 furnish a resistance for the circuit. Therefore, it may be readily understood that the lights 30 are an important feature and serve to not only indicate when the exterminator is not in thorough working order, but also serve to prevent any injury to the exterminator by furnishing a resistance for the current.

As a guard for the exterminator from persons coming into contact with the wires 6, we employ a screen hood 31, which we place over the wires 6. This screen hood entirely incases the wires and their supports 7 and 8, and thus prevents accidental abridging of the wires 6 by foreign substances. This screen is provided at its bottom with outwardly extending flanges 32, which rest upon the top of the casing 15, and through which flanges pins 33 are passed, and enter the casing 15, thus securely holding the hood in position.

For the support of a bait or substance which will attract insects, we employ a spear 34 protruding into the space incased by the wires 6. This spear is provided with a threaded shank 35, which passes through the insulated support 7, and is provided with nuts 36 and 37 for locking the said spear in position. To the pointed extremity of this spear, in the space incased by the wires 6, may be applied the bait or other substance for attracting the insects.

For attracting insects to the vicinity of our exterminator, at night, we employ a light 38, which is also arranged in the space inclosed by the wires, and supplied with electricity by means of a conductor 39, which conductor may be attached to the lighting circuit of the building or connected up in any suitable manner to supply the light 38.

From the foregoing it will be readily understood that as soon as a fly or other insect bridges any two adjacent wires 6, a current of electricity will be sent through the body of the insect and instantly electrocute the same, whereupon the insect falls from the wires into the receptacle 14, which we have shown as containing water. However, this receptacle may or may not contain water, as may be desired.

We have in mind in particular the extermination of flies with our improved exterminator, and to this end we have illustrated the same especially designed for the electrocution of flies, but the exterminator may be used for the extermination of other insects as well.

While we have described and illustrated a specific construction of our invention, it is understood that the same may be deviated from without departing from the spirit of the invention.

Having thus described our invention, what we claim is:

In an insect exterminator the combination with a source of electrical energy, of a plurality of bars connected with the said source, and forming a part of a circuit, supports upon which the said bars are mounted, said supports being formed of insulating material and the bars being insulated from each other, the front portion of one of the supports having a pair of separated sector-shaped contacts mounted thereon, over which the forward extremities of the bars alternately overlap, the circuit being adapted to be closed through the body of an insect when coming into contact with any two adjacent bars, and a removable drawer arranged beneath said bars into which the insects are adapted to drop after having been electrocuted for the purpose set forth.

In testimony whereof we affix our signatures in presence of two witnesses.

ERNEST A. ALLEN.
FRANK A. SPEENBURG.

Witnesses:
C. E. BRADEN,
F. E. BOWEN.